United States Patent
Zaruba et al.

(10) Patent No.: US 12,526,611 B2
(45) Date of Patent: Jan. 13, 2026

(54) CALL INTEGRATION WITH COMPUTER-GENERATED REALITY

(71) Applicant: T-Mobile Innovations LLC, Overland Park, KS (US)

(72) Inventors: Robert Ralph Zaruba, Overland Park, KS (US); Mark Davis Holland, Arlington, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 560 days.

(21) Appl. No.: 17/986,151

(22) Filed: Nov. 14, 2022

(65) Prior Publication Data

US 2024/0163647 A1    May 16, 2024

(51) Int. Cl.
*H04W 4/16*    (2009.01)
*G02B 27/01*    (2006.01)

(52) U.S. Cl.
CPC ............ *H04W 4/16* (2013.01); *G02B 27/017* (2013.01)

(58) Field of Classification Search
CPC . H04W 4/16; G02B 27/017; G02B 2027/014; H04L 67/131; H04L 69/14
See application file for complete search history.

(56) References Cited

U.S. PATENT DOCUMENTS

| | | | | |
|---|---|---|---|---|
| 10,242,501 B1 * | 3/2019 | Pusch | ................. | H04N 19/43 |
| 11,163,358 B2 * | 11/2021 | Marks | ................. | G06F 3/013 |
| 11,553,087 B1 * | 1/2023 | Cannady | ............ | H04M 3/5133 |
| 11,812,194 B1 * | 11/2023 | Vandyke | ................. | G06F 3/167 |
| 2011/0086711 A1 * | 4/2011 | Dunko | ................. | A63F 13/30 463/41 |
| 2017/0358140 A1 * | 12/2017 | Kohler | ............ | G02B 27/0172 |
| 2018/0342106 A1 * | 11/2018 | Rosado | ................ | G06Q 10/109 |

OTHER PUBLICATIONS

Szczurek, Krzysztof Adam, et al. "Multimodal multi-user mixed reality human-robot interface for remote operations in hazardous environments." IEEE Access 11 (2023): 17305-17333. (Year: 2023).*
Schier, Florian, et al. "Viewr: Architectural-scale multi-user mixed reality with mobile head-mounted displays." IEEE Transactions on Visualization and Computer Graphics 30.8 (2023): 5609-5622. (Year: 2023).*

* cited by examiner

*Primary Examiner* — Sharad Rampuria
(74) *Attorney, Agent, or Firm* — Shook Hardy & Bacon L.L.P.

(57) ABSTRACT

The technology described herein allows a user to bring phone functionality into a virtual world without disrupting the virtual world experience. For example, the technology described herein enables the user to make and receive calls while in the virtual world, access their contacts, and recent call information. The user may also send and receive text communications. This functionality may be enabled by a phone-sharing application running on a Head Mounted Device ("HMD") interfacing with the wireless telecommunication network that provides service to the user's telephone (e.g., smartphone). The phone-sharing application can communicate with the telecommunication network to provide notice that the user is actively using the HMD (e.g., in a virtual world). Upon receiving the notice, the telecommunication network can associate the user's telephone number with the HMD to cause communications to be routed to the HMD.

15 Claims, 7 Drawing Sheets

CALL INTEGRATION WITH COMPUTER-GENERATED REALITY

CROSS-REFERENCE TO RELATED APPLICATIONS

None.

BACKGROUND

Virtual reality technology employs specialized computing hardware and software to provide users with perceptually-real and fully-immersive virtual environments to interact with and explore. Virtual reality technologies can place users into virtual, computer-generated environments, where they can perceive and interact with virtual objects rendered therein. While virtual environments and the virtual objects within them may appear present in a user's perceived virtual environment, they are typically not present in the user's immediate physical world. The same can generally be said about the converse, more specifically, that objects present in the user's immediate physical environment are typically not present in the user's perceived virtual environment.

Virtual environments and virtual objects perceived in virtual reality are graphically rendered for stereoscopic display, to be perceived by a user wearing fully-immersive virtual reality equipment, such as a head-mounted display. By virtue of its fully-immersive nature, virtual reality technology restricts the user's ability to view their physically-surrounding environment, or in other words, the user's real world surroundings. There is, in essence, a clear disconnect between a user's real world environment and a fully-immersive virtual environment in which the user is perceiving within the real world environment. This disconnect prevents a user from easily interacting with real-world devices, such as a phone. Currently, a user may need to leave the computer-generated environment to participate in a phone call, send or receive texts, or interact with a social media application on the user's phone.

SUMMARY

The technology described herein allows a user to bring phone functionality into a virtual world without disrupting the virtual world experience. For example, the technology described herein enables the user to make and receive calls while in the virtual world, access their contacts, and recent call information. The user may also send and receive text communications. The user's normal phone number is used in these communications. Without the technology described herein, the user needs to remove their virtual reality glasses to make or receive a telephone call on their phone.

This functionality may be enabled by a phone-sharing application running on a Head Mounted Device ("HMD") interfacing with the wireless telecommunication network that provides service to the user's telephone (e.g., smartphone). The phone-sharing application can communicate with the telecommunication network to provide notice that the user is actively using the HMD (e.g., in a virtual world). Upon receiving the notice, the telecommunication network can associate the user's telephone number with the HMD. Instead of sending a telephone call over the telecommunication network to the phone, the telephone call may be routed through a Wi-Fi connection to the HMD using the HMD's IP address and/or other identifying information.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Immersive technology refers to perceptual and interactive technologies that, in essence, blur the line between the physical world and the simulated world. Perceptual technologies can trick a user's brain into believing that digital information being perceived in virtual space is real. Interactive technologies, on the other hand, can recognize user outputs (e.g., speech, gestures, movements, etc.) detected in physical space, and can respond to it in virtual space, accordingly. Together, perceptual and interactive technologies can provide users with an illusion that an immersive virtual environment or "virtual world" is just as real as the physical environment or "physical world" in which they are present.

The technology described herein allows a user to bring phone functionality into a virtual world without disrupting the virtual world experience. For example, the technology described herein enables the user to make and receive calls while in the virtual world, access their contacts, and recent call information. The user may also send and receive text communications. The user's normal phone number is used in these communications.

The telephone communication may occur using a telephone number associated with a user's telephone. The use of the user's typical telephone number enables the user to make and receive telephone calls in the virtual world without disrupting the virtual world experience. Without the technology described herein, the user needs to remove their virtual reality glasses to make or receive a telephone call on their phone. This functionality may be enabled by a phone-sharing application running on an HMD that interfaces with the wireless telecommunication network that provides service to the user's telephone (e.g., smartphone). The phone-sharing application can communicate with the telecommunication network to provide notice that the user is actively using the HMD (e.g., in a virtual world). Upon receiving the notice, the telecommunication network can associate the user's telephone number with the HMD. Instead of sending a telephone call over the telecommunication network to the phone, the telephone call may be routed through a Wi-Fi connection to the HMD using the HMD's IP address and/or other identifying information.

In addition, communications normally sent and received by a smart phone using a telephone number can be shared with other users within the virtual world. For example, the technology described herein allows a user to share the audio content received from the telecommunication network during a telephone conversation with one or more additional people located within the virtual world. The communications can be output to the user within the virtual world to one or more users. The one or more additional users may be designated by the first user. Non-designated users active in the virtual world may not be given access to the audio content. In the case of a telephone call, the audio from a telephone call can be output through the head mounted display through which the user accesses the virtual world. Likewise, a text or video may be shared within the virtual world. For example, a text may be displayed on a wall or other surface within the virtual world. The displayed text may be visible to the user and other designated users, but not be visible to non-designated users, even if the non-designated users are in a location within the virtual world (e.g., standing next to a designated user) where the displayed text is otherwise visible.

In an aspect, unique interface features within the virtual world are used to surface phone functions to the user within the virtual world. For example, a phone both may be displayed within the virtual world. Upon entering the both, a user may see a phone call interface that allows the user to select a contact, recently used phone number, dial a number, or take other steps to place a call. Thus, entering the booth triggers display of the phone interface and may cause initiation of a communication session with the telecommunication network. In an aspect, the user adds other virtual users to the call my letting them enter the phone both. All users in the phone booth can then hear the call. The dimensions of the phone booth can be expanded as more users enter the booth. In aspects, the exterior looks like a phone booth, but the interior is a room with the appearance of an office, conference room, living room, and any other space.

As used herein, Virtual reality (VR) is a fully-immersive technology, where a user of the technology can only perceive a rendered virtual environment and virtual objects therein, as if the perceived visual information was their present reality. While immersed in the virtual world, typically when wearing a head-mounted display (e.g., VR headset), the user is visually disconnected from the real world. In other words, while a user can still physically roam about in the real world, the user can only perceive the displayed virtual world and the virtual objects therein.

As will be utilized throughout the present disclosure, the terms "real-world" or "physical" can be used interchangeably, both corresponding to tangible or non-virtual environments or objects. Moreover, the term "on-the-fly" or "real-time" are interchangeably referenced to correspond to a responsive behavior, such as the performance of an operation in response to the receipt of data or a signal (e.g., from a sensor). While such responsive behaviors may be limited in speed or response times in some situations, it is contemplated that the responsive behavior is performed in a manner that is preferably substantially instantaneous (e.g., less than 1 second). Further, as will be utilized throughout the present disclosure, the terms "render" and "generate" are interchangeably referenced to correspond to the digital creation of a virtual object or environment, such as one that can be provided for display to a HMDAs one of ordinary skill in the art may appreciate, a movement (e.g., traversal, walking, roaming) within a physical environment can correspond to perceived movement within a virtual environment. That is, as a user changes his/her location (e.g., takes a step) in their physical environment, a corresponding change in location can be perceived in the perceived virtual environment. In this regard, in some aspects, dimensions (e.g., width, length, height, relative distance) of a physical object in a physical environment can correspond to a virtual object in a virtual environment.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
AOCN Administrative Operator Carrier Number
CA Carrier Aggregation
CD-ROM Compact Disk Read Only Memory
CDMA Code Division Multiple Access
CLLI Common Language Location Identifier
CSI Channel State Information
DVD Digital Versatile Discs
EEPROM Electrically Erasable Programmable Read Only Memory
eNB Evolved Node B
FD-MIMO Full-Dimension Multiple-Input Multiple-Output
FDD Frequency Division Duplex
gNB Next Generation Node B
GPRS General Packet Radio Service
GSM Global System for Mobile communications
HSS Home Subscriber Server
I-CSCF Interrogating Call Session Control Function
IBCF Interconnection Border Control Function
IoT Internet of Things
LTE Long Term Evolution
MAC Media Access Control
MID Management Instrumentation and Discovery
MIMO Multiple-Input Multiple-Output
MME Mobile Management Entity
MU-MIMO Multi-User Multiple-Input Multiple-Output
NR New Radio
OCN Operator Carrier Number
OFDM Orthogonal Frequency-Division Multiplexing
OTDOA Observed Time Difference of Arrival
P-CSCF Proxy Call Session Control Function
PC Personal Computer
PDA Personal Digital Assistant
PLMN Public Land Mobile Network
QoS Quality of Service
RAM Random Access Memory RF Radio-Frequency
ROM Read Only Memory
RSRP Reference Signal Received Power
RSRQ Reference Signal Received Quality
RSSI Received Signal Strength Indicator
S-CSCF Serving Call Session Control Function
SIM Subscriber Identity Module
SINR Signal-to-Interference and Noise Ratio
SIP Session Initiation Protocol
SPID Service Provider ID
TAS Telephony Application Server
TDD Time Division Duplex
TDMA Time Division Multiple Access
UICC Universal Integrated Circuit Card
VLAN Virtual Local-Area-Network
VoIP Voice Over Internet Protocol
VoLTE Voice over LTE
VoNR Voice over NR In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Further, the term "some" may refer to "one or more." Additionally, an element in the singular may refer to "one or more." The term "combination" (e.g., a combination thereof, combinations thereof) may refer to, for example, "at least one of A, B, or C"; "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

Additionally, a "computing device," as used herein, is a device that has the capability of using a wireless communications network, and may also be referred to as a "user device," "mobile device," "user equipment," "wireless communication device," or "UE." A computing device, in some aspects, may take on a variety of forms, such as a PC, HMD (e.g., a virtual reality headset, augmented reality glasses) a laptop computer, a desktop computer, a tablet, a mobile phone, a PDA, a server, or any other device that is capable of communicating with other devices (e.g., by transmitting or receiving a signal) using a wireless communication. A computing device may be, in an embodiment, similar to user equipment described herein with respect to FIGS. 1 and 2. A user device may also be, in another embodiment, similar to user device 700, described herein with respect to FIG. 7.

In aspects, a computing device (i.e., user equipment) discussed herein may be configured to communicate using one or more of 4G (e.g., LTE), 5G, 6G, another generation communication system, or a combination thereof. In some aspects, the computing device has a radio that connects with a 4G cell site but is not capable of connecting with a higher generation communication system. In some aspects, the computing device has components to establish a 5G connection with a 5G gNB, and to be served according to 5G over that connection. In some aspects, the computing device may be an E-UTRAN New Radio—Dual Connectivity (ENDC) device. ENDC allows a user device to connect to an LTE eNB that acts as a master node and a 5G gNodeB that acts as a secondary node. As such, in these aspects, the ENDC device may access both LTE and 5G simultaneously, and in some cases, on the same spectrum band.

Wireless telecommunication services (e.g., the transfer of information without the use of an electrical conductor as the transferring medium) may be provided by one or more telecommunication network providers. Wireless telecommunication services may include, but are not limited to, the transfer of information via radio waves (e.g., Bluetooth®), satellite communication, infrared communication, microwave communication, Wi-Fi, millimeter wave communication, mobile communication, or a combination thereof. Embodiments of the present technology may be used with different wireless telecommunication technologies or standards, including, but not limited to, CDMA 1xAdvanced, GPRS, Ev-DO, TDMA, GSM, WiMax technology, LTE, LTE Advanced, other technologies and standards, or a combination thereof.

A network providing the wireless telecommunication services may be a telecommunication network(s), or a portion thereof. A telecommunication network might include an array of devices or components (e.g., one or more cell sites). The network can include multiple networks, and the network can be a network of networks. In embodiments, the network is a core network, such as an evolved packet core, which may include at least one mobility management entity, at least one serving gateway, and at least one Packet Data Network gateway. The mobility management entity may manage non-access stratum (e.g., control plane) functions such as mobility, authentication, and bearer management for other devices associated with the evolved packet core.

In some aspects, a network can connect one or more computing devices to a corresponding immediate service provider for services, such as 5G and LTE, for example. In aspects, the network provides wireless telecommunication services comprising one or more of a voice service, a message service (e.g., SMS messages, MMS messages, instant messaging messages, an EMS service messages), a data service, other types of wireless telecommunication services, or a combination thereof. In aspects, the wireless telecommunication services are provided to user devices or corresponding users that are registered or subscribed to a telecommunication service provider to utilize the one or more services. The network can comprise any communication network providing voice, message, or data service(s), such as, for example, a 1x circuit voice, a 3G network (e.g., CDMA, CDMA2000, WCDMA, GSM, UMTS), a 4G network (WiMAX, LTE, HSDPA), a 5G network, a 6G network, another generation network, or a combination thereof.

As used herein, the term "cell site" (used for providing UEs with access to the telecommunication services) generally refers to one or more cellular base stations, nodes, RRUs control components, and the like (configured to provide a wireless interface between a wired network and a wirelessly connected user device). A cell site may comprise one or more nodes (e.g., eNB, gNB, or other nodes) that are configured to communicate with user devices. In some aspects, the cell site may include one or more band pass filters, radios, antenna arrays, power amplifiers, transmitters/receivers, digital signal processors, control electronics, GPS equipment, and the like. The one or more nodes corresponding to the cell site may comprise one or more of a macro base station, a small cell or femtocell base station, a relay base station, a combination thereof, and so forth. In aspects, the cell site may be configured as FD-MIMO, massive MIMO, MU-MIMO, cooperative MIMO, 3G, 4G, 5G, another generation communication system, or a combination thereof. In addition, the cell site may operate in an extremely high frequency region of the spectrum (e.g., from 30 GHz to 300 GHz), also known as the millimeter band.

Figure 1:
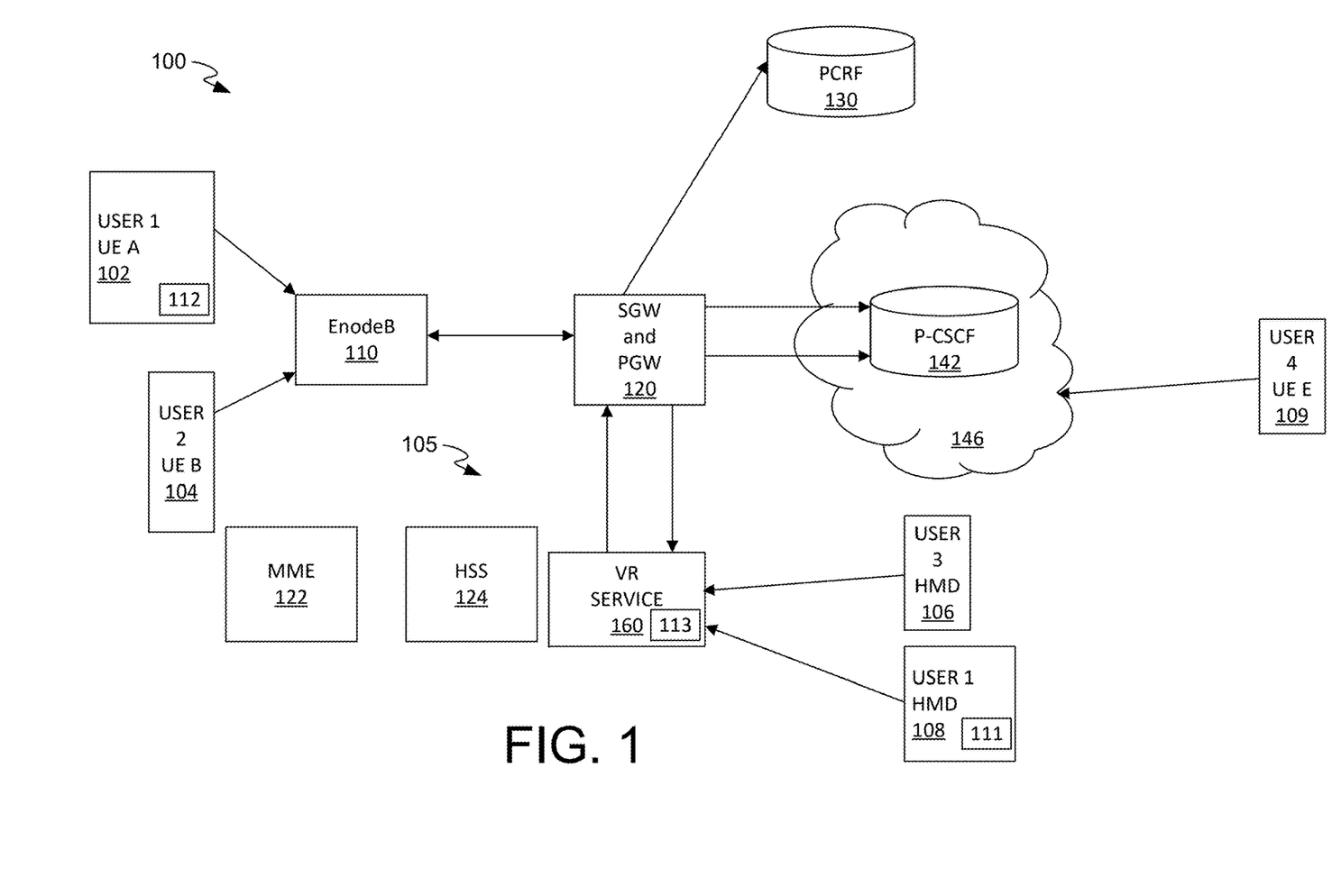
FIG. 1 is a block diagram of an example operating environment for a virtual service and telecommunications network, in accordance with some embodiments of the present disclosure.

Turning now to FIG. 1, an example telecommunications environment 100 with virtual reality service is illustrated. The environment 100 includes user device A 102 associated with a first user, user device B 104 associated with a second user, HMD C 106 associated with a third user, HMD D 108 associated with first user, and user device E 109 associated with a fourth user. The technology described herein allows the first user to access the functions of the user device A 102 while using the HMD D 108. The user device A 102 includes a phone-function sharing application 112. The HMD D 108 includes a phone-function receiving application 111. The VR service 160 includes a phone-function virtualization application 113. These three applications interact with functions of the other components in the telecommunications environment 100 to enable phone functionality on the HMD D 108.

The phone-function sharing application 112 communicates phone content to the phone-function receiving application 111 and/or to the telecommunications network (e.g., IMS core 146 and/or EPC core 105). The phone-function sharing application 112 may also receive content from the phone-function receiving application 111. In one aspect, the phone-function receiving application 111 provides a virtual-world activation notification to the phone-function sharing application 112. The virtual-world activation notification indicates that the user is now wearing the HMD 108 and is viewing virtual reality. This notification may be triggered by sensors on the HMD. For example, an eye tracker in the HMD may confirm that the user's eyes are viewing the content output by the HMD. Other combinations of sensors and signals could be used to determine that the user is viewing virtual reality. The sensor data and signal characteristics may be compared against a notification criterion to trigger communication of the notification.

In response to receiving the notification, the phone-function sharing application 112 can communicate a transfer request to the IMS core 146 and/or EPC core 105. The transfer request can include an IP address and/or other identification information for the HMD. The identification information can be used to route calls and texts directed to the UE's telephone number to the HMD rather than the UE A 102. Alternatively, calls and texts are sent both to the HMD and UE. The identification information for the HMD can be provided in the virtual-world notification.

As an alternative embodiment, the phone-function sharing application 112 can synchronize communications with the phone-function receiving application 111 over a BLUETOOTH connection or Wi-Fi connection. The communications, such as text and email, can then be transferred directly from the phone to the HMD without involving the IMS core 146 and EPC core 105. The HMD is then able to provide an interface for presenting communications, composing communications, and managing communications.

The phone-function receiving application 111 receives phone content from the UE A 102 and/or the telecommunications network. This content may be output to the user. The phone-function receiving application 111 can include an application-programming interface (API) that allows developers to import the phone functionality into the virtual world. The virtual world application can provide an interface for controlling a phone, such as the interface shown in FIG. 3. The content can be passed through the phone-function receiving application 111 to the virtual world application and included in the interface. Similarly, the phone-function receiving application 111 can receive control inputs provided by the user within the virtual world. These control inputs can be communicated to the UE via the phone-function sharing application 112.

The phone-function receiving application 111 can transfer content received from the phone into the virtual world. For example, the phone-function receiving application 111 can communicate audio content received from a second user who is outside of the virtual world into the virtual world through an audio channel used by the first user inside the virtual world. The audio channel is the channel the user typically uses to communicate with others within the virtual world. The audio channel may be part of the data communicated over a data connection between the HMD and the VR service 160. The phone-function receiving application 111 can forward audio content received from the phone via the virtual world audio channel. In this way, the first and second user can share communications, such as phone call content, with users inside the virtual world. The second user does not need to be connected to the virtual world directly. Instead, the second user calls the first user while the first user is interacting in the virtual world.

The phone-function virtualization application 113 can be used to generate a phone control application within the virtual world. The phone-function virtualization application 113 can receive a designation of users within the virtual world who are able to see or hear phone content from the first user within the virtual world. All other people in the virtual world would be excluded from the content. In aspects, the additional users are selected through an interface provided inside the virtual world. In one aspect, the interface uses authorized virtual proximity as a proxy for authorizing shared content. The authorized virtual proximity can be allowing the additional users into a room occupied by the first user. As an alternative, additional users are selected by gesturing within the virtual reality.

The environment 100 includes IMS core 146 and EPC core 105. The Evolved Packet Core (EPC) represents the Core of an LTE network. It is formed by multiple nodes, the main ones being MME (Mobility Management Entity) 122, S/PGW (Serving Gateway) and PGW (PDN Gateway) 120, HSS (Home Subscriber Server) 124, and PCRF (Policy and Charging Rules Function) 130. The nodes offer multiple functionality like mobility management, authentication, session management, setting up bearers and application of different Quality of Services.

The eNodeB 110 is the hardware that is connected to the user equipment network that communicates directly wirelessly with user equipment (102,104). In some aspects, eNodeB 110 may be part of a cell site that comprises a macro base station, a small cell or femto base station, a relay, and so forth. A cell site is deployed in a network to control and facilitate, via one or more antenna arrays, the broadcast, transmission, synchronization, and receipt of one or more wireless signals in order to communicate with, verify, authenticate, and provide wireless communications service coverage to one or more computing devices or other types of devices that request to join or are connected to the network.

The PGW 120 is the network node that connects the EPC to external IP networks. The PGW routes packets to and from external IP networks. Beyond that, it also allocates an IP address to all UEs and enforces different policies regarding IP user traffic such as packet filtering.

The MME 122 performs signal functions in the core network 105. The MME 122 may be further configured to send and receive signaling information needed to set up and address calls to the base station(s) and contains security protocols for authentication and authorization.

The MME 122 may access a Home Subscriber Server (HSS) 124. The HSS 124 is a main subscriber database that provides details of network subscribers to other entities, such as the MME 122, within a telecommunications network. The MME 122 may access the HSS 124 to verify an identity, and subscriber details, of the originating user equipment (102, 104) that are initiating a wireless communication with another client device within a destination network.

The PCRF node 130 may enable detection of communication service data flow and provide parameters for policy control and/or charging control. The PCEF (not shown) enforces the PCR rules by deciding whether data should go through the PGW 120 or not.

In various examples, an IP Multimedia Subsystem (IMS) core 146 may reside within the first telecommunications network environment 100. The IMS core 146 may include application function(s) 142, such as a Proxy Call Session Control Function (P-CSCF) 142 and other functions that are not shown for the sake of simplicity. These functions may include an Interrogating Call Session Control Function (I-CSCF), and a Serving Call Session Control Function (S-CSCF), a Telephone Application Server (TAS), an Interconnection Border Control Function (IBCF). The P-CSCF 142 behaves like a proxy by accepting requests and serving them internally or forwarding them towards to the I-CSCF and S-CSCF. The S-CSCF acts as a Session Initiation Protocol (SIP) registrar and in some cases as a SIP redirect server. The S-CSCF is responsible for processing the location registration of a client device, client authentication, call routing, and processing. The I-CSCF is tasked with selecting an S-CSCF for serving an initial SIP request, particularly when a client device initiating the request does not know which S-CSCF should receive the request. The IBCF is a network element deployed to protect the first telecommunications network, The IBCF may provide the first telecommunications network with measurements, access control, and data conversion facilities of communications received at the network edge.

The user equipment (102, 104, and 109) and HMD (106, 108) may be configured to communicate by way of one or more transmissions with cell sites using 3G, 4G, 5G, another generation, or a combination thereof. Generally, a wireless communication session may be initiated by a request from an originating UE A 102 (as an example) to initiate a session with a destination device. The telecommunications network may then relay the request, and subsequently the communication, through the internet to a destination network and destination device or recipient. In some instances, the telecommunication network may provide attestation information for the identity of the originating UE. Attestation information improves the likelihood that the request to initiate a communication session between the originating UE A 102 and the destination client device will be completed at the destination device.

In virtual reality (VR) systems, users may be immersed in and interact with a digitally simulated virtual environment provided by a VR service 160. The VR service 160 can maintain the state of the virtual world and output video and audio signals to the HMDs (106, 108) connected to the VR service 160. Similarly, the HMDs (106, 108) can communicate audio signals and control signals to the VR server. In aspects, the virtual world can simultaneously host multiple users. The virtual world can be generated as part of a multi-player video game environment, social network, and other service or application.

Figure 2:
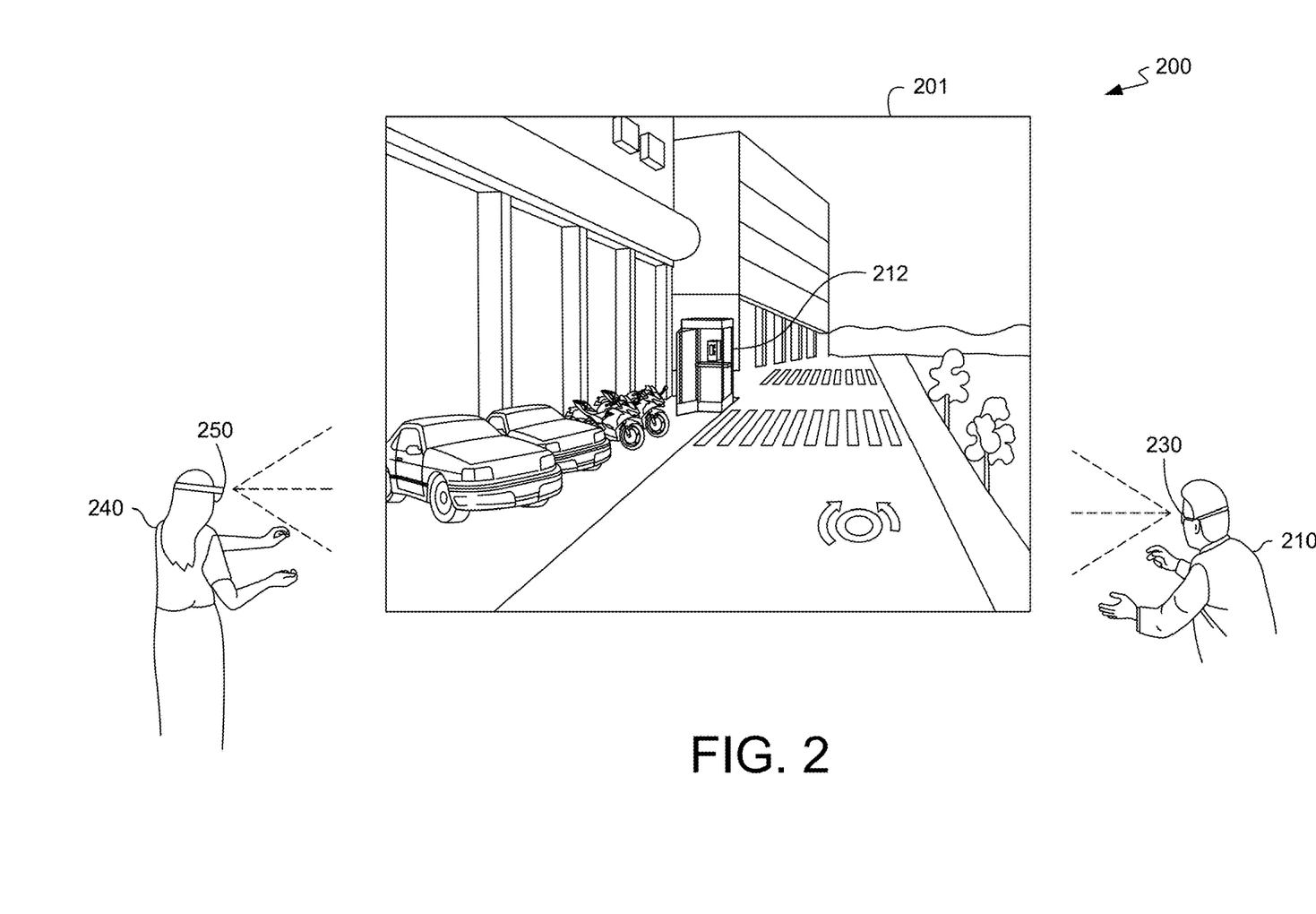
FIG. 2 is a block diagram of an example virtual world, in accordance with some embodiments of the present disclosure.

For example, referring to FIG. 2, VR scenario 200 includes one or more computers 202 or mobile devices, VR headset 230 worn by user 210, and one or more sensors (not shown) for detecting VR input from user 210, e.g., in the form of movement, voice, gestures, etc. VR output may be presented to user 210, e.g., VR headset 230 may present a three-dimensional (3D) stereoscopic view of a virtually simulated VR environment 201 to user 210, audio may be generated corresponding to VR environment 201 using audio output equipment (e.g., headphones or speakers) not shown in FIG. 2, or other output modalities may be included such as temperature, tactile response, etc.

User 210 may interact with VR environment 201 using any of a plurality of input modalities, e.g., spoken commands, hand gestures, virtual "touch" of icons displayed in the environment, other types of body orientation and/or movement signals, etc. The VR system may accordingly adjust the presentation of VR environment 201 to user 210 using the visual and/or other VR output modalities. Note the particular details of the VR system of FIG. 2 are described herein for illustrative purposes only, and are not meant to limit the scope of the present disclosure to any embodiments specifically mentioned, e.g., types of input or output modalities, types of VR environment or applications, etc.

In an embodiment, VR headset 230 and other input/output sensors of the VR system may be in communication with a user equipment (not shown), which in turn is in communication with a network supporting the virtual reality world. In an alternative embodiment, VR headset 230 may directly be in communication with such a network. Such alternative embodiments are contemplated to be within the scope of the present disclosure.

In FIG. 2, VR environment 201 is illustratively shown to be a VR simulation of a street-level environment (hereinafter denoted "VR street 201"), although it will be appreciated that any type of VR environment may be accommodated using techniques of the present disclosure. In VR street 201, user 210 may be immersed in a VR environment in which he or she experiences the sensation of standing and moving outdoors on a street lined with many venues and other objects. In VR street 201, user 210 may have the option of approaching and interacting with various venues and objects in the simulation. For example, by walking towards virtual phone booth 212, and performing a gesture such as touching the handle of the booth door using a specific hand gesture, the VR system may infer an intent by user 210 to enter the interior of the phone booth 212 and virtually make a call or send a text.

Figure 3:
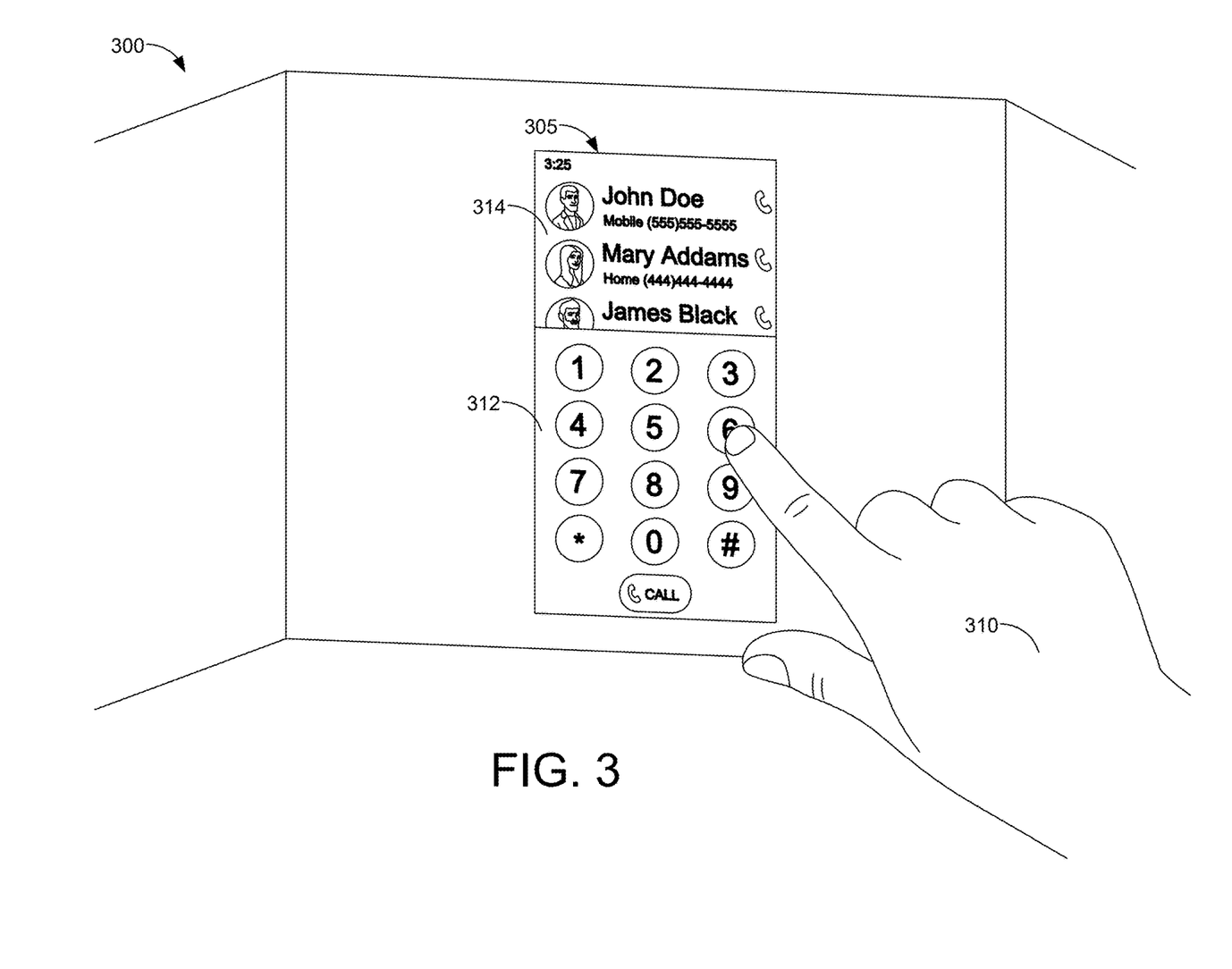
FIG. 3 depicts a variety of illustrations showing example phone interface in a virtual world, in accordance with some embodiments of the present disclosure.

In response to detecting such a gesture or other type of VR input signal, the VR system may accordingly cause VR environment 201 to transition to a second VR environment, such as VR environment 300 shown in FIG. 3. In FIG. 3, VR environment 300 is illustratively shown as corresponding to a virtual phone booth (hereinafter denoted "VR booth"), and is illustrated from the simulated perspective of the user within the phone booth 212. In VR environment 300, user 210 may virtually experience making a call or receiving a text, etc., all of which may correspond to mechanical input sensors physically engaged by user 210. In this example, the user's hand 310 interacts with a phone interface 305 projected on a surface within the VR environment 300. The phone interface includes a dial pad 312 and a contact list 314. The user may interact with the phone interface 305 by making gestures with their hand. The gesture may be detected by camera(s) on the HMD or by a control glove (not shown) worn by the user. The gesture can indicate the selection of an interface element, such as a number or contact. Upon entering a number or selecting a contact, the input may be communicated from the virtual service 160 to the HMD 108, which then initiates the call by communicating with the telecommunications network. The VR system may continually monitor the states of such mechanical input sensors, and may accordingly adjust the generated VR environment 301 in response to the inputs received.

Further aspects of the present disclosure provide for accommodating interaction between multiple users of a VR system in a joint VR environment using the techniques disclosed herein. FIG. 2 illustrates an example scenario accommodating multiple users according to the present disclosure. In FIG. 2, first user 210 and second user 240 are simultaneously engaged in a "joint" VR environment 201. In particular, a joint VR experience may be one in which multiple users may be immersed in respective VR environments sharing at least some of the same parameters, e.g., imagery, audio, context, etc., and further in which the users may be provided some opportunity to interact with each other visually and/or audibly.

For example, in VR street 201, both users 210, 240 may be immersed and virtually present in joint VR street 201 through receipt of respective output signals, e.g., generated by VR headsets 230, 250, audio speakers (not shown), etc. In an embodiment, the VR system may be configured to enable users 210, 240 to interact with each other and with the virtual environment. The users 210 and 240 may be co-located in the same real space or located in different areas of the real world (e.g., different cities, different countries).

For example, a virtual avatar (not shown) representing one of the users may be generated and projected by the VR system into VR environment 201, and other user(s) may view and interact with such avatar, as in real life. For example, first user 210 may speak to second user 240 by facing the avatar (not shown) corresponding to second user 210 in VR environment 201, and by speaking directly into a microphone or another audio input device. First user 210 and second user 240 may also jointly interact with other objects present in VR environment 201. For example, first user 210 may approach a driver's side of a virtual car and open the door, while second user 240 may simultaneously approach a passenger's side of the virtual car and open the door. In this instance, the VR system may interpret the users' inputs as indicating that both users desire to take part in the same joint driving simulation, such as student and teacher in a driving instruction simulation. The VR system may thus arrange for joint VR environment 201 to transition to joint driving VR environment (not shown), in which two (or more) users may participate.

Figure 4:
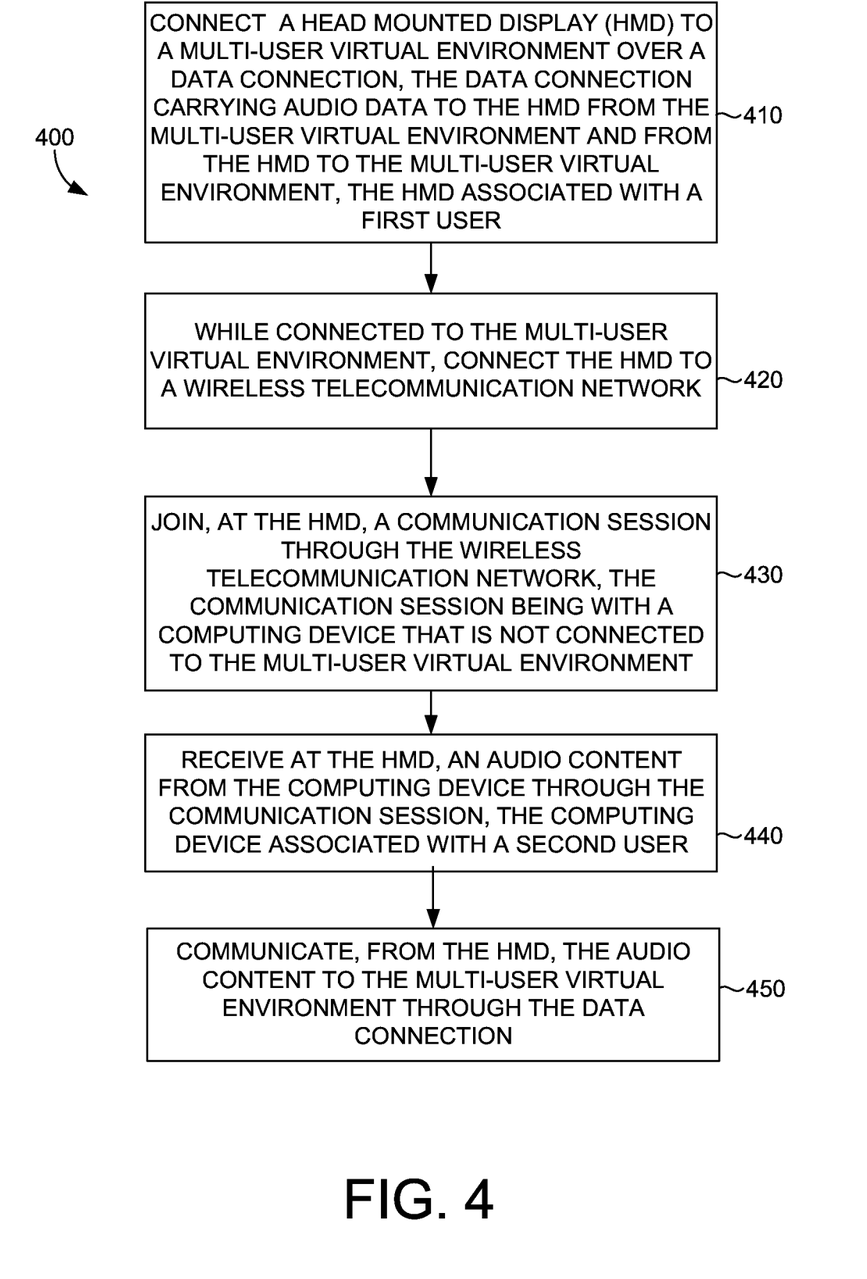
FIG. 4 is a flow chart depicting an example process for merging outside communications with a virtual environment, in accordance with some embodiments of the present disclosure.

Having described various aspects of the present disclosure, example methods are described below for merging outside communications with a virtual environment, in accordance with some embodiments. Referring to FIG. 4, a flow diagram is provided depicting a method 400 for merging outside communications with a virtual environment. Each block of method 400 and other methods described herein comprises a computing process that may be performed using any combination of hardware, firmware, and/or software. For instance, various functions may be carried out by a module, hardware device, or processor executing instructions stored in memory. Various portions of the methods may also be embodied as computer-usable instructions stored on computer storage media.

At step 410, the method 400 includes connecting a head mounted display (HMD) to a multi-user virtual environment over a data connection, the data connection carrying audio data to the HMD from the multi-user virtual environment and from the HMD to the multi-user virtual environment, the HMD associated with a first user.

At step 420, the method 400 includes while connected to the multi-user virtual environment, connecting, at the HMD, to a wireless telecommunication network.

At step 430, the method 400 includes joining, at the HMD, a communication session through the wireless telecommunication network, the communication session being with a computing device that is not connected to the multi-user virtual environment.

At step 440, the method 400 includes receiving, at the HMD, an audio content from the computing device through the communication session, the computing device associated with a second user.

At step 450, the method 400 includes communicating, from the HMD, the audio content to the multi-user virtual environment through the data connection.

Figure 5:
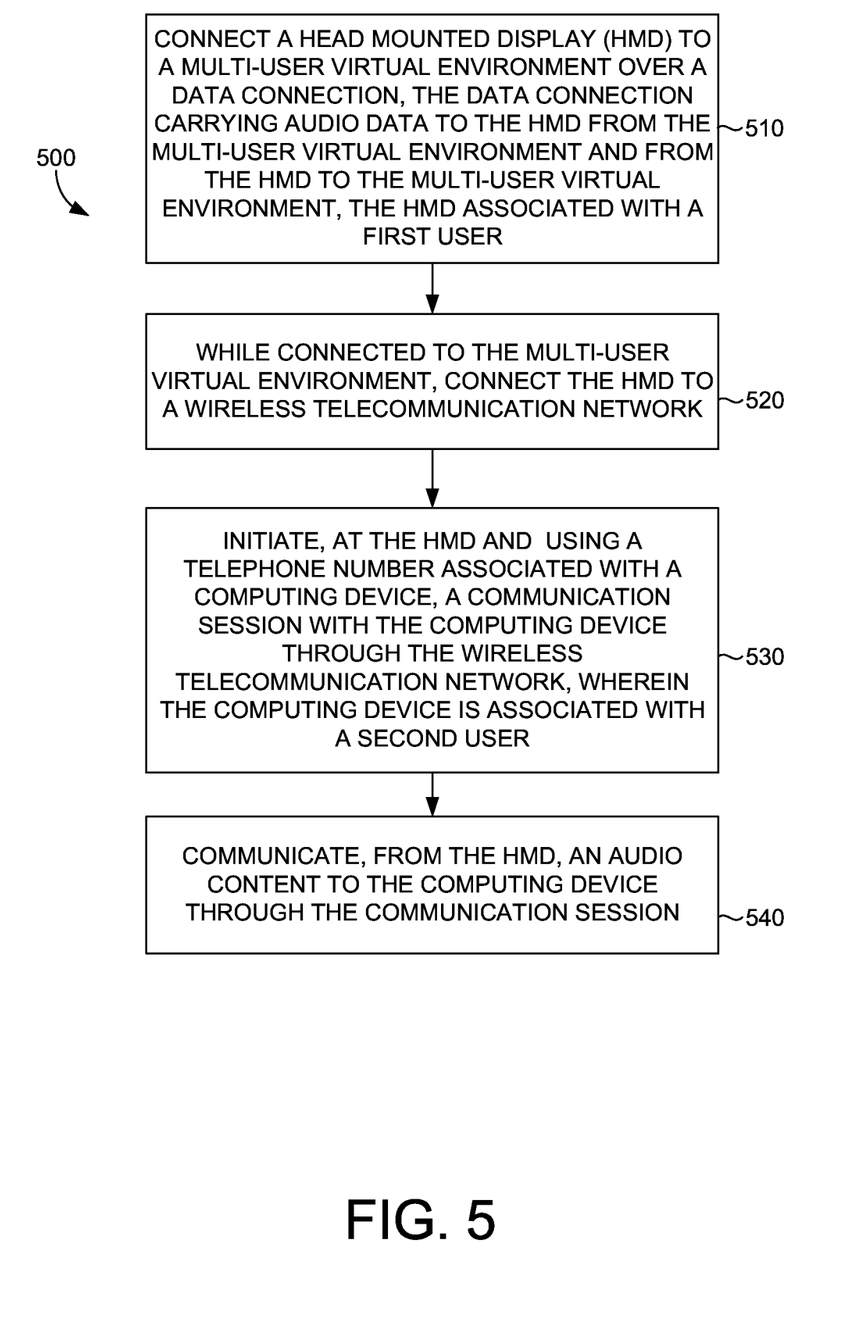
FIG. 5 is a flow chart depicting an example process for merging outside communications with a virtual environment, in accordance with some embodiments of the present disclosure.

Referring now to FIG. 5, a flow diagram is provided depicting a method 500 for merging outside communications with a virtual environment. In various embodiments, a head-mounted display (HMD) (e.g., HMD 110 of FIG. 1) is coupled to a computing device, such as reality blending device 115 of FIG. 1 or 210 of FIG. 2. In some embodiments, the HMD can be coupled to a set of tracking sensors, such as tracking sensors 120a of FIG. 1, and a set of environmental sensors, such as environmental sensors 120b of FIG. 1. In some embodiments, the environmental sensors 120b include acoustic and/or optical sensors that can generate, among other things, depth map frames and corresponding frames of image data, based on captured acoustic and/or optical information associated with a portion of the physical environment. In other words, the environmental sensors 120b can receive acoustic and/or optical information and generate, for any point in time, a depth map frame and a corresponding image data frame. In various embodiments, any one or more of the sensors can be rigidly fixed to the HMD or to a physical structure of the user's physical environment.

At step 510, the method 500 includes connecting a head mounted display (HMD) to a multi-user virtual environment over a data connection, the data connection carrying audio data to the HMD from the multi-user virtual environment and from the HMD to the multi-user virtual environment, the HMD associated with a first user.

At step 520, the method 500 includes while connected to the multi-user virtual environment, connecting, at the HMD, to a wireless telecommunication network.

At step 530, the method 500 includes initiating, at the HMD and using a telephone number associated with a computing device, a communication session with the computing device through the wireless telecommunication network, wherein the computing device is associated with a second user.

At step 540, the method 500 includes communicating, from the HMD, an audio content to the computing device through the communication session.

Figure 6:
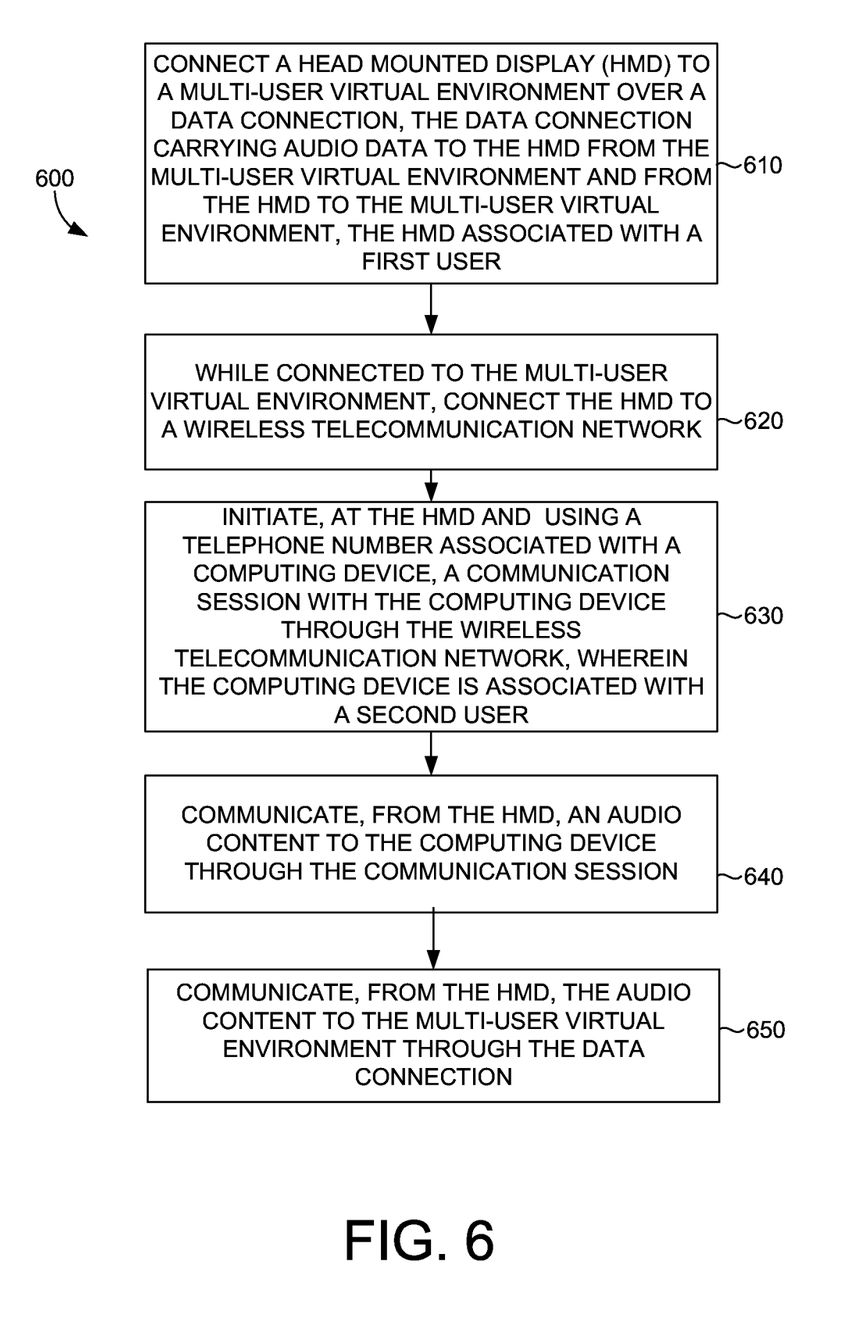
FIG. 6 is a flow chart depicting another example process flow for merging outside communications with a virtual environment, in accordance with some embodiments of the present disclosure.

Referring now to FIG. 6, a flow diagram is provided depicting a method 600 for merging outside communications with a virtual environment. In various embodiments, a head-mounted display (HMD) (e.g., HMD 110 of FIG. 1) is coupled to a computing device, such as reality blending device 115 of FIG. 1 or 210 of FIG. 2. In some embodiments, the HMD can be coupled to a set of tracking sensors, such as tracking sensors 120a of FIG. 1, and a set of environmental sensors, such as environmental sensors 120b of FIG. 1. In some embodiments, the environmental sensors 120b include acoustic and/or optical sensors that can generate, among other things, depth map frames and corresponding frames of image data, based on captured acoustic and/or optical information associated with a portion of the physical environment. In other words, the environmental sensors 120*b* can receive acoustic and/or optical information and generate, for any point in time, a depth map frame and a corresponding image data frame. In various embodiments, any one or more of the sensors can be rigidly fixed to the HMD or to a physical structure of the user's physical environment.

At step 610, the method 600 includes connecting a head mounted display (HMD) to a multi-user virtual environment over a data connection, the data connection carrying audio data to the HMD from the multi-user virtual environment and from the HMD to the multi-user virtual environment, the HMD associated with a first user.

At step 620, the method 600 includes, while connected to the multi-user virtual environment, connecting, at the HMD, to a wireless telecommunication network.

At step 630, the method 600 includes initiating, at the HMD and using a telephone number associated with a computing device, a communication session with the computing device through the wireless telecommunication network, wherein the computing device is associated with a second user.

At step 640, the method 600 includes communicating, from the HMD, an audio content to the computing device through the communication session.

At step 650, the method 600 includes communicating, from the HMD, the audio content to the multi-user virtual environment through the data connection.

Figure 7:
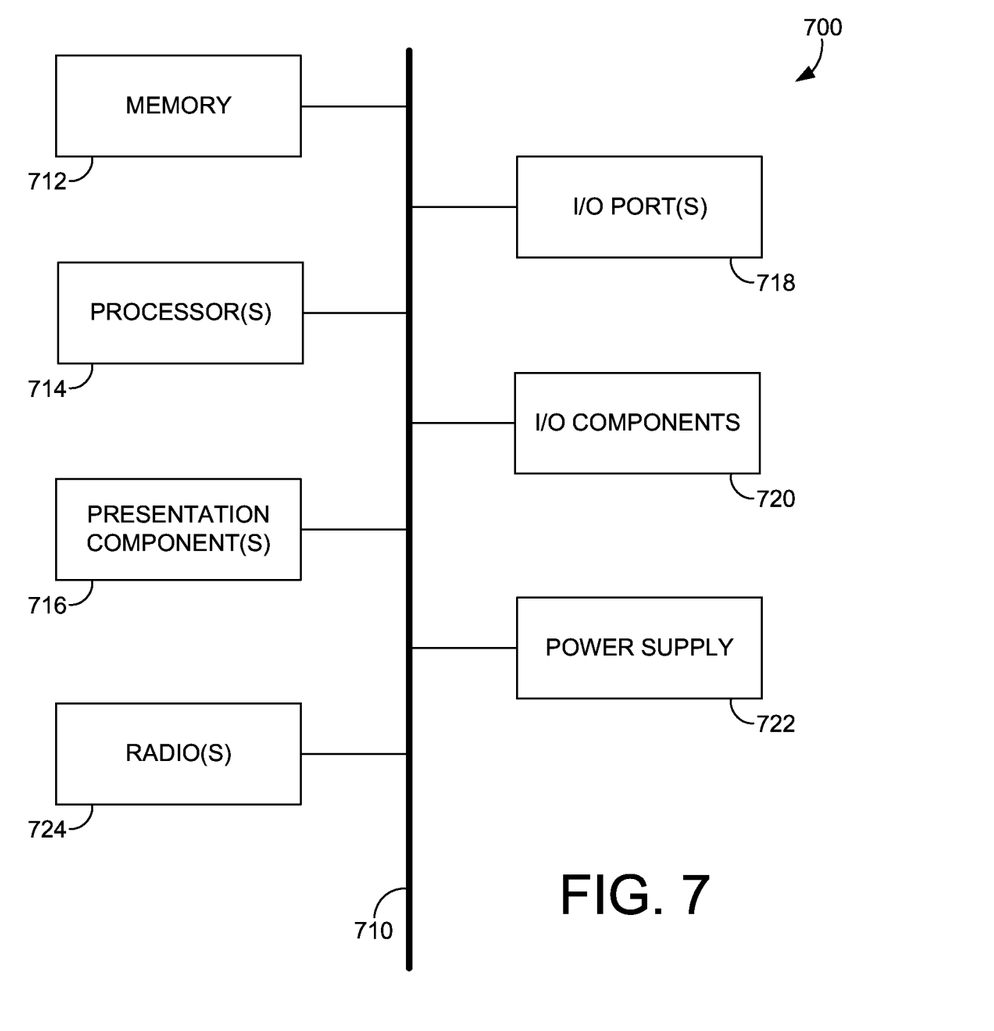
FIG. 7 is a block diagram of an example computing environment suitable for use in accordance with some embodiments of the present disclosure.

With reference now to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Example hardware devices include solid-state memory, hard drives, optical-disc drives, etc. Computing device 700 includes one or more processors that read data from various entities such as memory 712 or I/O components 720. Presentation component(s) 716 present data indications to a user or other device. Example presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of the detailed discussion above, embodiments of the present invention are described with reference to a head-mounted display unit comprising or coupled to a virtualizing computing device; however, the head-mounted display unit depicted herein is merely example. Components can be configured for performing novel aspects of embodiments, where configured for comprises programmed to perform particular tasks or implement particular abstract data types using code. Further, while embodiments of the present invention may generally refer to the head-mounted display unit and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method for merging outside communications with a virtual environment, the method comprising:
    connecting a head mounted display (HMD) to a multi-user virtual environment over a data connection, the data connection carrying audio data to the HMD from the multi-user virtual environment and from the HMD to the multi-user virtual environment, the HMD associated with a first user;
    while connected to the multi-user virtual environment over the data connection, connecting the HMD to a wireless telecommunication network;
    joining, at the HMD, a communication session through the wireless telecommunication network, the communication session being with a computing device that is not connected to the multi-user virtual environment;
    outputting the multi-user virtual environment for display to the first user through the HMD,
    wherein the first user is within a structure in the multi-user virtual environment with at least a second user, and
    wherein a third user is in multi-user virtual environment and outside the structure;
    receiving, at the HMD, an audio content from the computing device through the communication session, the computing device associated with a second user; and
    communicating, from the HMD, the audio content to the first user and the second user within the structure in to the multi-user virtual environment through the data connection,
    while not communicating the audio content to the third user outside of the structure.

2. The method of claim 1, wherein the audio content is received by a third user within the multi-user virtual environment.

3. The method of claim 1, wherein the method further comprises receiving image content from the device through the communication session; and
    communicating, from the HMD, at least a portion of the image content to the multi-user virtual environment through the data connection.

4. The method of claim 3, wherein the image content is a video.

5. The method of claim 1, wherein the HMD is associated with a telephone number within the wireless telecommunication network.

6. The method of claim 5, wherein the telephone number is used to initiate the communication session.

7. The method of claim 5, wherein the telephone number is also associated with a phone associated with the first user.

8. A non-transitory computer-storage medium storing computer-useable instructions that, when used by one or more computing devices, cause the one or more computing devices to perform operations comprising:
    connecting a head mounted display (HMD) to a multi-user virtual environment over a data connection, the data connection carrying audio data to the HMD from the multi-user virtual environment and from the HMD to the multi-user virtual environment, the HMD associated with a first user;
    while connected to the multi-user virtual environment, connecting the HMD to a wireless telecommunication network;
    outputting the multi-user virtual environment for display to the first user through the HMD;
    initiating, at the HMD and using a telephone number associated with a computing device, a communication session with the computing device through the wireless telecommunication network,
    wherein the computing device is associated with a second user, and
    wherein the communication session is initiated by the first user navigating into a virtual structure having an appearance of a phone booth located within the multi-user virtual environment; and
    communicating, from the HMD, an audio content to the computing device through the data connection.

9. The non-transitory medium of claim 8, wherein the operations method further comprises causing a name of the second user to be displayed to the first user within the virtual structure.

10. The non-transitory medium of claim 8, wherein the operations method further comprises causing a status of the communication session to be displayed to the first user within the virtual structure.

11. The non-transitory medium of claim 8, wherein the operations method further comprises communicating, from the HMD, the audio content to the multi-user virtual environment through the data connection.

12. The non-transitory medium of claim 8, wherein the operations further comprise receiving, at the HMD, an instruction from the first user to register the HMD with the wireless telecommunication network.

13. The non-transitory medium of claim 8, wherein the HMD connects to the wireless telecommunication network through a Wi-Fi connection.

14. A computer-implemented method for merging outside communications with a virtual environment, the method comprising:
    connecting a head mounted display (HMD) to a multi-user virtual environment over a data connection, the data connection carrying audio data to the HMD from the multi-user virtual environment and from the HMD to the multi-user virtual environment, the HMD associated with a first user;
    while connected to the multi-user virtual environment, connecting, at the HMD, to a wireless telecommunication network;
    initiating, at the HMD and using a telephone number associated with a computing device, a communication session with the computing device through the wireless telecommunication network,
    wherein the computing device is associated with a second user;
    communicating, from the HMD, an audio content to the computing device through the communication session;

outputting the audio content to multiple users within the multi-user virtual environment;

outputting a structure within the multi-user virtual environment that includes avatars associated with the multiple users and excludes other users presently in the multi-user virtual environment, wherein the other users presently in the multi-user virtual environment do not receive the audio content; and communicating, from the HMD, the audio content to the multi-user virtual environment through the data connection.

15. The method of claim 14, wherein the communication session is initiated by the first user navigating into a virtual structure having an appearance of a phone booth located within the multi-user virtual environment.

* * * * *